United States Patent
Hiranaka et al.

(10) Patent No.: US 8,137,503 B2
(45) Date of Patent: Mar. 20, 2012

(54) STRIPPING LIQUID FOR USE IN SEPARATING PAPER FROM PLASTER/PAPER LAMINATE

(75) Inventors: Shingo Hiranaka, Shunan (JP); Genji Taga, Shunan (JP)

(73) Assignee: Tokuyama Corporation, Shunan-Shi (JP)

( * ) Notice: Subject to any disclaimer, the term of this patent is extended or adjusted under 35 U.S.C. 154(b) by 333 days.

(21) Appl. No.: 12/223,461

(22) PCT Filed: Feb. 5, 2007

(86) PCT No.: PCT/JP2007/052423
§ 371 (c)(1),
(2), (4) Date: Jul. 31, 2008

(87) PCT Pub. No.: WO2007/094277
PCT Pub. Date: Aug. 23, 2007

(65) Prior Publication Data
US 2009/0032187 A1   Feb. 5, 2009

(30) Foreign Application Priority Data
Feb. 13, 2006   (JP) .................. 2006-035068

(51) Int. Cl.
*B29C 41/14*   (2006.01)

(52) U.S. Cl. .................. 156/703; 156/715; 156/717

(58) Field of Classification Search .................. 156/344, 156/703, 715, 717; 510/200
See application file for complete search history.

(56) References Cited

U.S. PATENT DOCUMENTS
4,466,849 A * 8/1984 Dantsker .................. 156/248

FOREIGN PATENT DOCUMENTS

| | | |
|---|---|---|
| EP | 1712303 A1 | 10/2006 |
| FR | 2123340 A1 | 9/1972 |
| GB | 1375758 A | 11/1974 |
| JP | 57053574 A * | 3/1982 |
| JP | 6-142638 A | 5/1994 |
| JP | 10-030317 * | 2/1998 |
| JP | 10-30317 A | 2/1998 |
| JP | 10-286553 A | 10/1998 |

(Continued)

OTHER PUBLICATIONS

EPO Extended European Search Report, Appl. No. 07708330.1, Mar. 8, 2011, pp. 1-3.

*Primary Examiner* — Khanh P Nguyen
*Assistant Examiner* — Vishal I Patel
(74) *Attorney, Agent, or Firm* — Birch, Stewart, Kolasch & Birch, LLP

(57) ABSTRACT

A stripping liquid of the present invention is used for separating the paper from a plaster/paper laminate such as waste plasterboard, and comprises an aqueous solution of an alkali metal salt or an ammonium salt of carboxylic acid. The stripping liquid is fed onto the surface (paper surface) of the plaster/paper laminate so as to infiltrate into the bonding surface between the plaster and the paper, so that the carboxylate is made present on the bonding surface. Upon stripping off the paper in the presence of the carboxylate, it is allowed to entirely separate the paper from the plaster. Upon mixing the stripping liquid and a nonionic surfactant or a water-soluble organic solvent together, further, the stripping liquid can be quickly and reliably infiltrated into the bonding surface between the plaster and the paper.

7 Claims, 1 Drawing Sheet

FOREIGN PATENT DOCUMENTS

| | | | |
|---|---|---|---|
| JP | 2000-126746 A | | 5/2000 |
| JP | 2000-254531 A | | 9/2000 |
| JP | 2004-122076 A | | 4/2004 |
| JP | 2004-181862 | * | 7/2004 |
| JP | 2004-181862 A | | 7/2004 |
| JP | 2004-307321 A | | 11/2004 |
| JP | 2005-161300 A | | 6/2005 |
| JP | 2006-273599 A | | 10/2006 |
| JP | 2006-273599 | * | 12/2006 |
| WO | 92/10560 A1 | | 6/1992 |
| WO | 93/14181 A1 | | 7/1993 |

* cited by examiner

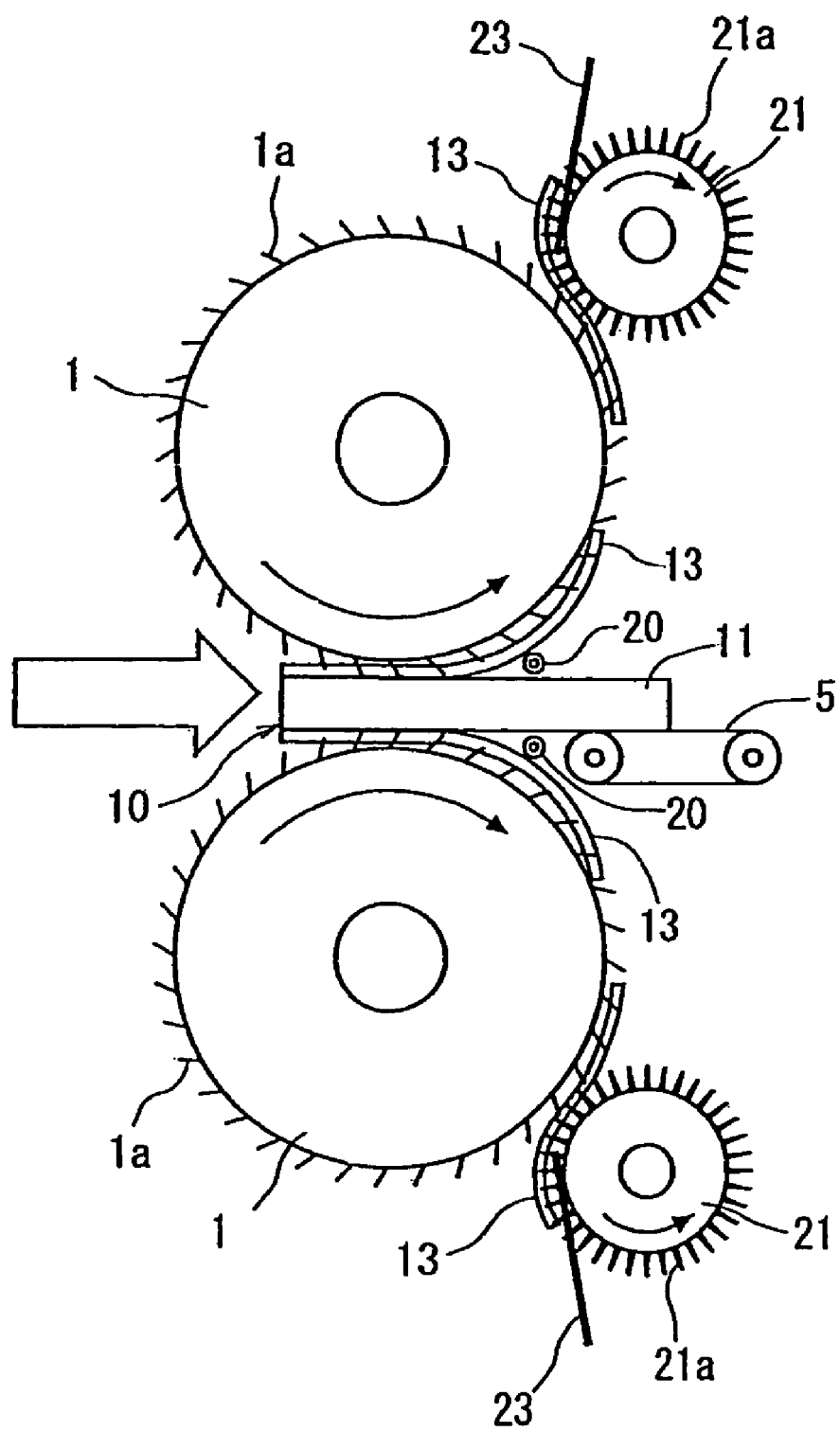

STRIPPING LIQUID FOR USE IN SEPARATING PAPER FROM PLASTER/PAPER LAMINATE

TECHNICAL FIELD

This invention relates to a stripping liquid used for separating the paper from a plaster/paper laminate and to a method of separating the paper from the plaster/paper laminate by using the stripping liquid.

BACKGROUND ART

The plasterboards that are wasted amounts to about 1,500,000 tons a year, about 500,000 tons of which being chips and scraps stemming from the production and interior works of newly constructing the houses, and have been recycled by the plasterboard manufacturers. The rest of about 1,000,000 tons are those stemming from the remodeling and/or demolishing works of buildings such as houses, and have been buried in the reclaiming sites. However, the amounts of the waste plasterboards are on the increase year after year, and it has been urged to effectively reuse the waste plasterboards from the standpoint of the shortage of reclaiming sites and load on the environment.

The plasterboard has, usually, been used in the form of a laminate with the paper by bonding a board paper onto the surface of the plaster substrate. The board paper is bonded to the plaster substrate by directly sticking the board paper onto the surface of the paste-like plaster blended with a water-soluble adhesive such as starch.

To effectively recycle the waste plaster, therefore, the plaster substrate and the paper must, first, be separated away from each other. A mixture of the plaster and the paper at present finds no use and is, therefore, buried in the administered reclaiming sites. Therefore, many methods have been proposed for separating the mixture into the plaster and the paper so that both of them can be effectively utilized again.

The methods can be roughly divided into those for stripping the paper off the plaster substrate without using liquid medium such as water (hereinafter called dry methods) and those for stripping the paper off the plaster substrate by using a liquid medium such as water (hereinafter called wet methods).

As the dry methods, patent document 1 proposes a method of separating the plaster and the paper from each other by pulverizing the waste plasterboard, roughly stripping the paper off the plasterboard (plaster substrate), recovering the papers of relatively large sizes through a sieve of a predetermined mesh size, and blowing the air at a predetermined flow rate to the papers of small sizes. Patent document 2 proposes a method of separating the plaster and the paper from each other by pulverizing the brittle plaster substrate by passing the waste plasterboard through a roller type-breaker having protrusions on the circumferential surface of the roll. Patent document 3 proposes a method wherein the waste plasterboard is pulverized to roughly separate the paper and the plaster from each other, and the plaster adhered to the paper is stripped off by using rollers having protrusions.

As the wet methods, patent document 4 proposes a method of heating the waste plasterboard and, thereafter, separating the paper from the plaster by feeding water thereto, and patent document 5 proposes a method of separating the plaster and the paper from each other by wet-heat-treating the waste plasterboard under the application of a pressure.

Patent document 1: JP-A-10-286553
Patent document 2: JP-A-2000-254531
Patent document 3: JP-A-2004-122076
Patent document 4: JP-A-6-142638
Patent document 5: JP-A-2004-307321

DISCLOSURE OF THE INVENTION

According to the dry methods proposed by the patent documents 1 to 3, however, the plaster and the paper are separated away from each other while pulverizing the waste plasterboard, but the plaster substrate and the paper cannot be entirely separated at the bonding surfaces thereof. Therefore, the recovered plaster contains paper dust in amounts of about several percent by mass while the recovered paper has adhered thereto the plaster in amounts nearly equal to the weight of the paper. The paper (recovered paper) to which the plaster is adhered cannot be reused in its form as the paper and is, usually, incinerated. Depending upon the burning conditions, however, the plaster component is decomposed producing sulfur oxides in large amounts and, therefore, leaving room for improvement.

According to the above dry methods, further, the waste plasterboard that is introduced into the pulverizer often causes a machine trouble if the waste plasterboard is wet. Generally, therefore, the waste plasterboard is treated being introduced in dry state into the pulverizer. When the dry waste plasterboard is pulverized, however, dust of the plaster and paper powder are produced in large amounts necessitating the environmental dust-collection treatment of a large scale.

According to the wet methods, on the other hand, the waste plasterboard of before being pulverized is treated with a liquid medium such as water improving the above-mentioned problem inherent in the dry methods. When the waste plasterboard is treated by the wet method, however, the steps become complex often requiring extended periods of processing time. For example, the methods proposed by the patent documents 4 and 5 require about one to two hours of heat treatment at not lower than 100° C. According to these methods, further, it is difficult to continuously treat large amounts of waste plasterboards, and the cost of treatment increases leaving room for improvement.

It is, therefore, an object of the present invention to provide a stripping liquid capable of easily and entirely separating the plaster and the paper from each other in very short periods of time in treating the plaster/paper laminate such as the waste plasterboard in which the plaster and the paper are bonded together.

Another object of the present invention is to provide a method of separating the paper from the plaster/paper laminate by using the stripping liquid.

The present inventors have newly discovered a fact that the paper and the plaster can be easily and entirely separated from each other if the paper is stripped off the plaster in a state where an alkali metal salt or an ammonium salt of carboxylic acid is made present in the bonding surface between the plaster and the paper of the plaster/paper laminate.

That is, according to the present invention, there is provided a stripping liquid for use in separating the paper from a plaster/paper laminate, comprising an aqueous solution of an alkali metal salt or an ammonium salt of carboxylic acid.

In the above stripping liquid, it is desired that:
(1) the carboxylic acid is malonic acid, malic acid, tartaric acid or citric acid; and
(2) a nonionic surfactant or a water-soluble organic solvent is, further, contained.

According to the present invention, there is further provided a method of separating the paper from a plaster/paper laminate by stripping the paper off the plaster under a condition where an alkali metal salt or an ammonium salt of carboxylic acid is made present in the bonding surface between the paper and the plaster of the plaster/paper laminate.

In the above separation method, it is desired that:

(3) a stripping liquid comprising an aqueous solution of the alkali metal salt or the ammonium salt of carboxylic acid is infiltrated into the bonding surface of the plaster/paper laminate, so that the salt of carboxylic acid is made present in the bonding surface;

(4) an aqueous solution of a nonionic surfactant or a water-soluble organic solvent is infiltrated into the bonding surface prior to infiltrating the stripping liquid into the bonding surface;

(5) the stripping liquid contains a nonionic surfactant or a water-soluble organic solvent;

(6) the paper is stripped off by using a stripping roller having needle-like protrusions formed on the surface thereof; and (7) the paper is stripped off by passing the plaster/paper laminate through a pair of the stripping rollers.

The stripping liquid of the present invention comprising an aqueous solution of the alkali metal salt or the ammonium salt of carboxylic acid is fed into the bonding surface between the plaster and the paper of the plaster/paper laminate. Upon feeding the stripping liquid, the carboxylate is made present in the bonding surface. Upon stripping the paper off the plaster in the presence of the carboxylate, it is allowed to entirely separate the paper from the plaster on the bonding surface. That is, the presence of the alkali metal salt or the ammonium salt of carboxylic acid weakens the strength of adhesion between the paper and the plaster enabling the plaster and the paper to be entirely separated from each other.

In the present invention, a phenomenon was discovered in that the strength of adhesion between the paper and the plaster is weakened by the alkali metal salt or the ammonium salt of carboxylic acid. Though the reason has not been clarified yet, the inventors presume it as described below.

The chelating effect of the carboxylate improves the solubility of plaster. The effect may differ depending upon the kind of the carboxylic acid. For example, an aqueous solution of trisodium citrate is capable of dissolving the plaster in mols equal to the mols of trisodium citrate that is dissolved. That is, a 100 mmols/l of trisodium citrate aqueous solution dissolves 100 mmols/l of the plaster. On the other hand, the aqueous solution of citric acid of the same molar concentration is capable of dissolving only 20 mmols/l of the plaster. The plaster dissolved in the aqueous solution of trisodium citrate, thereafter, reacts with the citric acid and precipitates as calcium citrate which is sparingly soluble in water. Namely, in the present invention, it is considered that upon making the alkali metal salt or the ammonium salt of carboxylic acid present in the bonding surface between the plaster and the paper, the plaster once dissolves and, thereafter, the dissolved plaster undergoes the reaction to precipitate as a calcium carboxylate which is sparingly soluble in water. As a result, entanglement between the paper fiber and the surface of the plaster is loosened, the strength of adhesion very decreases between the plaster and the paper, and the paper and the plaster are easily and entirely separated away from each other.

According to the present invention as described above, the paper and the plaster can be entirely separated away from each other. For example, the paper stripped off the plaster according to the invention has not substantially the plaster adhered thereto as will be understood from Examples appearing later. In Comparative Examples 1 to 3 in which the paper is stripped by feeding hot water, alcohol aqueous solution or ether aqueous solution to the bonding interface, on the other hand, the paper still remains on the surfaces of the plaster.

According to the present invention, further, the aqueous solution (stripping liquid) of the alkali metal salt or the ammonium salt of carboxylic acid (hereinafter often called simply carboxylate) is fed to the plaster/paper laminate by dipping, showering or spraying so as to infiltrate into the bonding interface to place the plaster/paper laminate in a state where it can be separated away into the plaster and the paper in about several tens of minutes at the longest or in about several tens of seconds at the shortest. Therefore, the paper can be separated away from the plaster very quickly. Besides, so far as the carboxylate is made present in the bonding interface between the paper and the plaster, the above effect is sustained. For example, once the stripping liquid is infiltrated into the bonding interface, the paper can be easily and entirely separated from the plaster even after the plaster/paper laminate is left to stand for several hours.

The stripping liquid of the invention containing the carboxylate can further contain a nonionic surfactant or a water-soluble organic solvent. This enhances the infiltration of the stripping solution enabling the carboxylate to be present in sufficient amounts in the bonding surface of the plaster/paper laminate in a short period of time. Therefore, the operation for separating the paper can be carried out in a further shortened period of time. Besides, the aqueous solution of the nonionic surfactant or the water-soluble organic solvent is infiltrated into the plaster/paper laminate prior to infiltrating the stripping liquid into the bonding surface, so that the stripping liquid can be highly infiltrated. When the water-soluble organic solvent is used, in particular, the paper that is secondarily separated away can be dried at an increased rate.

In the present invention as described above, the alkali metal salt or the ammonium salt of carboxylic acid is made present in the bonding surface as described above to weaken the strength of adhesion between the plaster and the paper. Therefore, the paper can be continuously stripped off the plaster by using stripping rollers having needle-like protrusions formed on the surfaces thereof. For example, the plaster/paper laminate is passed through the pair of the stripping rollers; i.e., the paper is continuously stripped off and is entirely separated away from the plaster, offering a very high industrial value.

The plaster recovered by separating the paper from the waste plasterboard (i.e., plaster/paper laminate) according to the invention can be used again as the dihydrate. It is further allowable to heat-treat the recovered plaster to use it as the hemihydrate or the anhydrous plaster. Here, since no paper is mixed, the plaster can be treated at a relatively low temperature without being discolored since no paper powder is carbonized. Further, the separated paper has neither the plaster adhered thereto nor is damaged by heating, and can be utilized again as the recovered paper. When the separated paper is incinerated, sulfur oxides (SOx gas) are effectively prevented from being generated.

BRIEF DESCRIPTION OF THE DRAWING

FIG. 1 is a view of a preferred example of the step of stripping off the paper in separating the paper away from the waste plasterboard according to the present invention.

BEST MODE FOR CARRYING OUT THE INVENTION (Plaster/Paper Laminate)

In the present invention, there is no particular limitation on the plaster/paper laminate that is to be treated provided the plaster and the paper are adhered together. Generally, however, the plaster/paper laminate to be treated is a waste plasterboard having a board paper adhered to the plaster substrate, and the present invention is applied when it is attempted to separate the paper from the waste plasterboard. That is, the waste plasterboard may be chips and scraps stemming from the production steps and the construction works on the sites, or may be waste building materials stemming from the remodeling and/or demolishing works of buildings. The paper is usually adhered to both surfaces of the plaster substrate but is often adhered to one surface or part of the surface thereof depending upon the form of the waste material. There is no particular limitation on the shape and size of the plaster/paper laminate. The plaster/paper laminate may, for example, have been pulverized. When the paper is to be continuously separated away from the plaster according to the present invention, in particular, it is desired that the waste plasterboard has a relatively large size without having been much pulverized.

(Stripping Liquid)

The stripping liquid of the present invention used for separating the paper from the plaster/paper laminate comprises an aqueous solution of an alkali metal salt or an ammonium salt of carboxylic acid.

The carboxylate which is industrially available can be used without any particular limitation. Concretely there can be used alkali metal salts and ammonium salts of compounds (carboxylic acids) having a carboxyl group in the molecules, such as formic acid, acetic acid, propionic acid, oxalic acid, malonic acid, succinic acid, lactic acid, oxymalonic acid, malic acid, tartaric acid, citric acid and gluconic acid. Particularly preferably, further, the alkali metal is sodium or potassium. The alkali metal salts and the ammonium salts of these carboxylic acids may be used in a manner that a carboxylate is used in a single kind or a plurality of kinds of carboxylates are used being mixed together. When the stripping liquid of the present invention uses a compound (carboxylic acid) having a plurality of carboxyl groups in the molecules, there is no particular limitation on the ratio by which the carboxyl groups turn into the alkali metal salts or the ammonium salts, but it is desired that all carboxyl groups turn into the alkali metal salts or the ammonium salts. For example, when the carboxylic acid is citric acid and the alkali metal is sodium, it is desired that the stripping liquid comprises an aqueous solution of trisodium citrate. As the carboxyl groups all turn into the alkali metal salt or the ammonium salt, the stripping liquid becomes weakly alkaline which is friendly for the machine and, further, enhances the effect for separating the paper from the plaster.

In the stripping liquid of the present invention, among the above carboxylates (alkali metal salt or ammonium salt), a carboxylate to which corresponding calcium carboxylate dissolves less as compared by using the aqueous solutions having the same molar concentration is desired from the standpoint of improving the paper-stripping property (shortening the time for separating the plaster and the paper from each other, lowering the strength of adhesion on the bonding surface between the plaster and the paper). Further, the carboxylic acid of the carboxylate having a small molecular weight works to increase the rate of infiltration into the plaster/paper laminate. By taking into consideration the effect of stripping the paper off the plaster/paper laminate and the rate of infiltration into the plaster/paper laminate, it is particularly desired to use a sodium salt, a potassium salt or an ammonium salt of malonic acid, malic acid, tartaric acid or citric acid among the above carboxylates.

The stripping liquid of the present invention comprising an aqueous solution of an alkali metal salt or an ammonium salt of the carboxylic acid is prepared by, for example, mixing sodium hydroxide, potassium hydroxide or ammonia into the aqueous solution of the above carboxylic acid, or by dissolving the crystals of the sodium salt, potassium salt or ammonium salt of the carboxylic acid in water.

The concentration of the carboxylate in the aqueous solution used as the stripping liquid is not particularly limited and may be suitably determined within a range in which the carboxylate that is used dissolves. By taking into consideration the solubility of the carboxylate and the operability for use as the stripping liquid, however, it is desired that the concentration of the carboxylate is 0.1 to 50% by mass and, particularly, 1 to 30% by mass. When a plurality of kinds of carboxylates are used, it is desired that the total concentration of the carboxylates satisfies the above range.

In the present invention, the aqueous solution (stripping liquid) of the carboxylate may further contain other additives within a range in which the stripping effect does not decrease. In particular, it is desired that the aqueous solution (stripping liquid) of the carboxylate is blended with at least one of a nonionic surfactant or a water-soluble organic solvent as an assistant component. This quickens the rate of infiltration of the stripping liquid into the bonding surface between the plaster and the paper without impairing the effect of the carboxylate for improving the stripping property. In the plaster/paper laminates such as plasterboards, in general, the paper surfaces are, in many cases, treated to repel water. That is, by blending the nonionic surfactant or the water-soluble organic solvent, a surface tension of the stripping liquid decreases. Accordingly, even when the paper surfaces have been treated to repel water, the rate of infiltration into the bonding surface between the paper and the plaster is increased. Further, use of the stripping liquid blended with the water-soluble organic solvent offers a secondary advantage of increasing the rate of drying the paper that is separated and recovered by a method that will be described later.

In the present invention, there is no particular limitation on the nonionic surfactant or the water-soluble organic solvent that is industrially available provided it decreases the surface tension of the aqueous solution of the carboxylate. Described below are their preferred examples.

For example, the nonionic surfactant having an HLB of 12 to 15 can be effectively used. Concrete examples include polyoxyethylene alkyl ether, polyoxyethylene alkylphenyl ether, etc., which can be mixed in a single kind or in a combination of a plurality of kinds into the stripping liquid.

If the operability is taken into account, the water-soluble organic solvent is methanol, ethanol, n-propanol, 2-propanol, 2-butanol, t-butanol, dimethyl ketone or methyl ethyl ketone. These water-soluble organic solvents can be mixed in a single kind or in a combination of a plurality of kinds into the stripping liquid.

In the present invention, the amount of blending the assistant component such as the nonionic surfactant or the water-soluble organic solvent may be suitably determined depending upon the kind of the assistant component and the kind of the carboxylate used for the stripping liquid in a range in which the assistant component dissolves. Usually, by taking the economy and the operability into consideration, it is desired that the nonionic surfactant is added to the stripping liquid at a concentration of 0.01 to 20% by mass and, particularly, 0.1 to 10% by mass, while the water-soluble organic solvent is added to the stripping liquid at a concentration of 0.1 to 30% by mass and, particularly, 1 to 20% by mass.

(Separation of the Paper from the Plaster/Paper Laminate)

In the present invention, the carboxylate is made present in the bonding surface of the plaster/paper laminate, and the paper is stripped off so as to be quickly and entirely separated.

That is, upon making the carboxylate present in the bonding surface between the plaster and the paper, the stripping liquid is infiltrated into the bonding surface. The stripping liquid can be infiltrated into the bonding surface by various means, such as (1) using a brush or a coating roller to feed the stripping liquid onto the surface of the paper so as to infiltrate into the bonding surface, (2) dipping the plaster/paper laminate in the stripping liquid to infiltrate the stripping liquid into the bonding surface, or (3) feeding the stripping liquid to the surfaces of the paper by showering or spraying so as to infiltrate into the bonding surface.

The amount of the stripping liquid is determined depending upon the size and shape of the plaster/paper laminate to be treated and the concentration of the carboxylate in the stripping liquid, so that the carboxylate is made present at a sufficient concentration in the bonding surface between the plaster and the paper. The stripping liquid exhibits a very high effect for separating the paper and is, usually, used in a considerably small amount. Concretely, the stripping liquid may be used in such an amount that the carboxylate is fed to the plaster/paper laminate in an amount of not less than 0.1 part by mass and, particularly, not less than 0.5 parts by mass per 100 parts by mass of the plaster/paper laminate. The stripping liquid that is fed in an amount larger than the required amount simply spoils the economical advantage. It is, therefore, desired that the carboxylate is fed to the plaster/paper laminate in an amount not larger than 2 parts by mass.

In the present invention, further, an aqueous solution of the nonionic surfactant or the water-soluble organic solvent may be infiltrated into the plaster/paper laminate prior to feeding the stripping liquid. That is, upon infiltrating the aqueous solution of the nonionic surfactant or the water-soluble organic solvent in advance, the stripping liquid that is fed thereafter can be quickly infiltrated into the bonding surface between the plaster and the paper. This method is effective particularly when the surfaces of the paper have been treated to repel water.

When the above method is employed, the amount of the aqueous solution of the nonionic surfactant or the water-soluble organic solvent may be determined depending upon the shape and size of the plaster/paper laminate and the degree of water-repelling treatment, so that the stripping liquid quickly infiltrates into the bonding surface between the plaster and the paper. By taking the operability and economy into consideration, in general, it is desired that the aqueous solution of the nonionic surfactant has a concentration of about 0.1 to 20% by mass, and is used in such an amount that the nonionic surfactant is fed in an amount of 0.05 to 10 parts by mass per 100 parts by mass of the plaster/paper laminate. It is, further, desired that the water-soluble organic solvent is fed in an amount of 0.05 to 20 parts by mass per 100 parts by mass of the plaster/paper laminate. The aqueous solution of the nonionic surfactant and the water-soluble organic solvent may be used alone or being mixed together, as a matter of course.

The nonionic surfactant and the water-soluble organic solvent may be the same as those exemplified concerning the stripping liquid, and may be fed by the same method as the one used for the stripping liquid.

The treatment for infiltrating the stripping liquid may, as required, be carried out under the heated condition. However, the stripping liquid of the invention is capable of so lowering the strength of adhesion between the plaster and the paper that the infiltration treatment may usually be conducted at room temperature.

As described above, the present invention feeds the stripping liquid to the plaster/paper laminate enabling the strength of adhesion between the paper and the plaster to be greatly decreased in a very short period of time. For example, the stripping liquid infiltrates into the bonding surface between the plaster and the paper in about several tens of seconds after the stripping liquid is fed or in about several seconds under an optimized condition, and the strength of adhesion very decreases. Therefore, the paper can be stripped off substantially after the feeding of the stripping liquid. With the stripping liquid (carboxylate) being made present in the bonding surface between the plaster and the paper, the strength of adhesion decreases and the paper can be easily stripped off. Therefore, the processing does not necessarily have to be continuously executed. The paper-stripping operation may be executed after the treated plaster/paper laminate is left to stand for, for example, about several hours. According to the present invention, therefore, feeding the stripping liquid and, thereafter, stripping the paper may be executed in separate places.

In the present invention, the paper can be stripped off the plaster by any method. For example, the paper can be stripped off by hand or can be mechanically stripped off by using a stripping roller having needle-like protrusions formed on the surface thereof. Whichever method is employed according to the present invention, the strength of adhesion between the paper and the plaster has been greatly lowered, and the paper can be easily and entirely stripped off the plaster. In particular, the paper can be mechanically stripped off by using a member such as stripping rollers, which is a very great advantage of the present invention.

FIG. 1 illustrates an example of stripping the paper off the waste plasterboard by using stripping rollers.

That is, referring to FIG. 1, a pair of stripping rollers 1, 1 are arranged. The stripping rollers 1, 1 are so rotating that the surfaces thereof move in the same direction at a nipping position thereof. Needle-like protrusions 1a are formed at a suitable density on the surface of the stripping roller 1. The waste plasterboard 10 comprises a plaster substrate 11 and board papers 13 adhered onto both surfaces thereof. The above stripping liquid has been infiltrated into the waste plasterboard 10, and the adhesion has been greatly decreased between the plaster substrate 11 and the board paper 13.

As will be understood from FIG. 1, the waste plasterboard 10 is passed through the pair of stripping rollers 1, 1 by using a suitable conveyer 5 (conveyer on the inlet side has been omitted); i.e., the board papers 13 are caught by the needle-like protrusions 1a and are automatically stripped off.

When the paper (board paper 13) is to be stripped off as described above, the gap between the pair of stripping rollers 1 and 1 (gap between the needle-like protrusions 1a and 1a) is set to be slightly smaller than the thickness of the waste plasterboard 10. It is, further, desired to provide guide bars 20 and 20 on the outlet side of the waste plasterboard 10, so that the board papers 13 stripped off the plaster substrate 11 are recovered being wound on the stripping rollers 1.

Paper-recovering rollers 21 and 21 are desirably so arranged as to face the stripping rollers 1 and 1. The paper-recovering rollers 21 have on the surfaces thereof needle-like protrusions 21a which are more rigid than the needle-like protrusions 1a of the stripping rollers 1. The needle-like protrusions 21a are stabbed into the board papers 13 wound on the stripping rollers 1 so that the board papers 13 are recovered from the stripping rollers 1 making it possible to continuously carry out the stripping operation. In order to quickly recover the board papers 13 from the stripping rollers 1, comb members 23 are desirably inserted near the nipping portions with the stripping rollers. Upon inserting the comb members 23, the rigid needle-like protrusions 21a can be erected at a position near at least the nipping portions, and can be stabbed to the board papers 13 to reliably recover them.

The plaster substrate 11 from which the board papers 13 are separated as described above is, as required, digested and is recovered as the plaster.

When the waste plasterboard 10 having the board paper 13 adhered on only one surface thereof is to be treated, an ordinary roller may be opposed to the stripping roller 1 to strip the board paper 13 off. When the pair of stripping rollers 1 and 1 are used being arranged as described above, however, the waste plasterboard 10 having the board paper 13 adhered to only one surface thereof can be treated without the need of adjusting the position of the surface on where the board paper 13 is adhered.

In the present invention described above, the plaster that is recovered after having been separated away from the paper does not contain the paper and can, therefore, be pulverized into suitable sizes and can be used as the dihydrate. Or, the plaster can be dry- or wet-heated so as to be used as the hemihydrate or the anhydrous plaster.

The paper separated away from the plaster does not contain the plaster and can, therefore, be utilized as the recovered paper. Further, the paper can be used as a fuel or can be incinerated without the probability of generating sulfur oxides ($SO_x$) since no plaster is contained and can, thus, be safely treated.

EXAMPLES

The invention will be described more concretely by way of Examples to which only, however, the invention is in no way limited.

In the following Examples and Comparative Examples, the amount of plaster adhered to the separated paper was found by a method described below. First, the separated paper was dipped in a sodium hydroxide aqueous solution of an amount sufficient for reacting with the plaster adhered to the paper, and was stirred for not less than 10 minutes. Thereafter, the sodium hydroxide aqueous solution was filtered and washed. The amounts of sulfur dissolved in the filtrate and in the washing solution were calculated as the plaster to thereby find the amount of the plaster adhered to the separated paper. Further, the amount of the paper adhered to the separated plaster was found from a difference between the dry weight of the separated paper and the dry weight of the paper from which the plaster was removed.

The plaster/paper laminate used for the experiment possessed the following specifications.
  Plaster/paper laminate: Chip stemming from the work of the plasterboard (with board papers on both surfaces)
  Size: 100 mm×100 mm
  Thickness of the board paper: 12.5 mm.

Example 1

An aqueous solution containing 10% by mass of disodium malonate was used as the stripping liquid.

The above stripping liquid was infiltrated into a sponge which was, then, repetitively pushed onto the surfaces of the papers of the plaster/paper laminate for about 10 minutes so that the aqueous solution was infiltrated into the bonding surface between the plaster and the papers. Thereafter, the plaster and the papers were separated from each other by hand.

The strength of adhesion was almost zero in the bonding surface between the plaster and the paper, and the plaster and the paper could be entirely separated from each other on the bonding surface.

The amount of the dihydrate adhered to the separated paper was 0% by mass and the amount of the paper adhered to the separated dihydrate was 0% by mass.

Example 2

An aqueous solution of a mixture of 90 parts by mass of an aqueous solution containing 5% by mass of disodium malate and 10 parts by mass of 2-propanol was used as the stripping liquid.

The plaster/paper laminates were dipped in the above stripping liquid in an atmosphere of 20° C. for 10 seconds, were, thereafter, left to stand for 10 seconds and for 2 hours, and were separated into the plaster and the paper by hand. Both the laminate left to stand for 10 seconds and the laminate left to stand for 2 hours possessed almost no strength of adhesion in the bonding surface between the plaster and the paper, and could be entirely separated into the plaster and the paper on the bonding surface. In both cases, further, the amount of the dihydrate adhered to the separated paper was 0% by mass and the amount of the paper adhered to the separated plaster was 0% by mass.

Example 3

An aqueous solution of a mixture of 99 parts by mass of an aqueous solution containing 10% by mass of trisodium citrate and 1 part by mass of polyoxyethylenelauryl ether (polymerization number of the ethylene oxide of 10) was used as the stripping liquid.

By using a coating roller impregnated with the above stripping liquid, the stripping liquid was infiltrated into the bonding surface between the plaster and the paper from the surface of the paper of the plaster/paper laminate in an atmosphere of 20° C. In this case, the stripping liquid could be readily infiltrated into the bonding surface between the plaster and the paper.

Next, after 20 seconds have passed, the treated plaster/paper laminate was thrown into between a pair of stripping rollers having sharp needle-like protrusions on the surfaces thereof, and was separated into the plaster and the paper in a manner that the paper portion was caught by the sharp protrusions. The plaster and the paper could be entirely separated from each other on the bonding surface thereof without any resistance.

The amount of the dihydrate adhered to (remained on) the separated paper was 2% by mass with respect to the paper and the amount of the paper adhered to the separated plaster was 0% by weight. The dihydrate adhered to (remained on) the separated paper was separated in a state of remaining on the paper since the surface of the plaster, too, was caught by the sharp needle-like protrusions. The plaster, however, could be easily removed by using a brush since it possessed almost no strength of adhesion to the paper.

Example 4

By using a coating roller impregnated with an aqueous solution containing 1% by mass of polyoxyethylenelauryl ether (polymerization number of the ethylene oxide of 10), the aqueous solution was infiltrated from the surface of the paper of the plaster/paper laminate in an atmosphere of 20° C.

Next, a coating roller was impregnated with an aqueous solution containing 5% by mass of trisodium citrate as the stripping liquid. By using the roller, the stripping liquid was infiltrated from the surface of the paper of the above treated plaster/paper laminate in an atmosphere of 20° C. In this case, the stripping liquid could be readily infiltrated into the bonding surface between the plaster and the paper.

After 20 seconds have passed, the plaster and the paper were separated from each other by hand. The strength of adhesion was almost zero on the bonding surface between the plaster and the paper, and the plaster and the paper could be entirely separated from each other on the bonding surface thereof.

The amount of dihydrate adhered to the separated paper was 0% by mass and the amount of the paper adhered to the separated plaster was 0% by mass.

Example 5

An aqueous solution of a mixture of 90 parts by mass of an aqueous solution containing 5% by mass of dipotassium malate and 10 parts by mass of 2-propanol was used as the stripping liquid.

The plaster/paper laminates were dipped in the above stripping liquid in an atmosphere of 20° C. for 10 seconds, were, thereafter, left to stand for 10 seconds and for 2 hours, and were separated into the plaster and the paper by hand. Both the laminate left to stand for 10 seconds and the laminate left to stand for 2 hours possessed almost no strength of adhesion in the bonding surface between the plaster and the paper, and could be entirely separated into the plaster and the paper on the bonding surface. In both cases, further, the amount of the dihydrate adhered to the separated paper was 0% by mass and the amount of the paper adhered to the separated plaster was 0% by mass.

Example 6

By using a coating roller impregnated with an aqueous solution containing 1% by mass of polyoxyethylenelauryl ether (polymerization number of the ethylene oxide of 10), the aqueous solution was infiltrated from the surface of the paper of the plaster/paper laminate in an atmosphere of 20° C.

Next, a coating roller was impregnated with an aqueous solution containing 5% by mass of the triammonium citrate as the stripping liquid. By using the roller, the stripping liquid was infiltrated from the surface of the paper of the above treated plaster/paper laminate in an atmosphere of 20° C. In this case, the stripping liquid could be readily infiltrated into the bonding surface between the plaster and the paper.

After 20 seconds have passed, the plaster and the paper were separated from each other by hand. The strength of adhesion was almost zero on the bonding surface between the plaster and the paper, and the plaster and the paper could be entirely separated from each other on the bonding surface thereof.

The amount of dihydrate adhered to the separated paper was 0% by mass and the amount of the paper adhered to the separated plaster was 0% by mass.

Comparative Example 1

The plaster/paper laminate was dipped in hot water of 80° C. for 2 hours. Thereafter, the laminate was separated into the plaster and the paper by hand. However, the paper remained on the surface of the plaster. The amount of the paper adhered to the surface of the separated plaster was 2% by mass with respect to the plaster.

Comparative Example 2

The plaster/paper laminate was dipped in an aqueous solution containing 10% by mass of 2-propanol for 1 minute. Thereafter, the laminate was separated into the plaster and the paper by hand. However, the paper remained on the surface of the plaster. The amount of the paper adhered to the surface of the separated plaster was 2% by mass with respect to the plaster.

Comparative Example 3

By using a coating roller impregnated with an aqueous solution containing 5% by mass of polyoxyethylenenonylphenyl ether (polymerization number of the ethylene oxide of 10), the aqueous solution was infiltrated from the surface of the paper of the plaster/paper laminate in an atmosphere of 20° C. Thereafter, the laminate was separated into the plaster and the paper by hand. However, the paper remained on the surface of the plaster. The amount of the paper adhered to the surface of the separated plaster was 2% by mass with respect to the plaster.

The invention claimed is:

1. A method of separating the paper from a Gypsum substrate/paper laminate by stripping the paper off the Gypsum substrate under a condition where an alkali metal salt or an ammonium salt of carboxylic acid is made present in the bonding surface between the paper and the Gypsum substrate of the Gypsum substrate/paper laminate, wherein the carboxylic acid that forms an alkali metal salt or an ammonium salt is a malonic acid, a malic acid, a tartaric acid or a citric acid.

2. The method of separating the paper according to claim 1, wherein a stripping liquid comprising an aqueous solution of an alkali metal salt or an ammonium salt of carboxylic acid is infiltrated into the bonding surface of the Gypsum substrate/paper laminate, so that the carboxylate is made present in the bonding surface.

3. The method of separating the paper according to claim 2, wherein an aqueous solution of a nonionic surfactant or a water-soluble organic solvent is infiltrated into the bonding surface prior to infiltrating the stripping liquid into the bonding surface.

4. The method of separating the paper according to claim 2, wherein said stripping liquid contains a nonionic surfactant or a water-soluble organic solvent.

5. The method of separating the paper according to claim 1, wherein the paper is stripped off by using a stripping roller having needle-like protrusions formed on the surface thereof.

6. The method of separating the paper according to claim 5, wherein the paper is stripped off by passing the Gypsum substrate/paper laminate through a pair of the stripping rollers.

7. The method of separating the paper according to claim 1, wherein the paper is directly attached to the Gypsum substrate in said Gypsum substrate/paper laminate prior to stripping.

* * * * *